United States Patent
Chan et al.

(10) Patent No.: US 8,431,809 B1
(45) Date of Patent: Apr. 30, 2013

(54) ELECTRONIC MUSIC DISPLAY

(75) Inventors: Andrew Lyon Chan, Palo Alto, CA (US); Thomas Chan, Palo Alto, CA (US)

(73) Assignee: Thomas Chan, Palo Alto, CA (US)

( * ) Notice: Subject to any disclaimer, the term of this patent is extended or adjusted under 35 U.S.C. 154(b) by 116 days.

(21) Appl. No.: 12/894,962

(22) Filed: Sep. 30, 2010

Related U.S. Application Data

(60) Provisional application No. 61/247,919, filed on Oct. 1, 2009.

(51) Int. Cl.
*G09B 15/02* (2006.01)

(52) U.S. Cl.
USPC ...... 84/483.2; 84/470 R; 84/477 R; 84/483.1; 84/484; 84/485 R

(58) Field of Classification Search .................. None
See application file for complete search history.

(56) References Cited

U.S. PATENT DOCUMENTS

| | | | | |
|---|---|---|---|---|
| 5,400,687 A | * | 3/1995 | Ishii | 84/477 R |
| 5,728,960 A | * | 3/1998 | Sitrick | 84/477 R |
| 2001/0037719 A1 | * | 11/2001 | Gardner et al. | 84/478 |
| 2005/0016368 A1 | * | 1/2005 | Perla | 84/723 |
| 2005/0204889 A1 | * | 9/2005 | Swingle et al. | 84/100 |
| 2006/0048632 A1 | * | 3/2006 | Morley et al. | 84/600 |
| 2006/0117935 A1 | * | 6/2006 | Sitrick | 84/477 R |
| 2008/0060499 A1 | * | 3/2008 | Sitrick | 84/477 R |
| 2008/0092723 A1 | * | 4/2008 | Sawyer-Kovelman et al. | 84/724 |
| 2008/0196575 A1 | * | 8/2008 | Good | 84/470 R |
| 2011/0203442 A1 | * | 8/2011 | Raveendran | 84/483.1 |
| 2011/0252945 A1 | * | 10/2011 | Humphrey | 84/470 R |
| 2011/0259177 A1 | * | 10/2011 | Humphrey | 84/470 R |
| 2011/0277615 A1 | * | 11/2011 | Kendler et al. | 84/483.2 |
| 2011/0283867 A1 | * | 11/2011 | Ihara | 84/478 |

* cited by examiner

*Primary Examiner* — Marlo Fletcher
(74) *Attorney, Agent, or Firm* — Silicon Valley Patent Group; Thomas Chan

(57) ABSTRACT

An electronic music display and methods of using the same are disclosed. In one embodiment, the electronic music display includes a user interface configured to receive one or more music files, a memory device configured to store the one or more music files, a controller configured to program the electronic music display in accordance with user specified requirements with respect to order of the one or more music files to be displayed and with respect to tempos that corresponding different sections of the one or more music files to be performed, and a display configured to display a sequence of pages of the one or more music files as programmed.

20 Claims, 18 Drawing Sheets

ELECTRONIC MUSIC DISPLAY

CROSS REFERENCE TO RELATED APPLICATIONS

This application claims the benefit of U.S. provisional application No. 61/247,919, "An Electronic Music Display" filed Oct. 1, 2009. The aforementioned United States application is hereby incorporated by reference in its entirety.

FIELD OF THE INVENTION

The present invention relates to the field of consumer electronics. In particular, the present invention relates to a method and system for an electronic music display.

BACKGROUND OF THE INVENTION

For centuries, musicians have been using printed paper to display music scores. When performing a piece of music that is not memorized, musicians typically either ask someone to turn the pages for them or free up a hand to quickly turn the pages themselves. There are a number of drawbacks of having someone to turn the pages. First, it requires the person who turns the pages to be on the stage with the musician, which affects the overall look-and-feel of the performance, because the person turning the page is not only a distraction to the musician but also to the audience. Besides, it creates work for the musician to find and coordinate with this person prior to the performance. It may create additional work for the musician if he needs to rehearse the performance with this person. Even with the above drawbacks, having someone to turn the pages may work for solo performances but the situation would be much more difficult if the performance involves a large group of musicians.

There are also drawbacks if the musicians turn the paper sheets themselves. For many instruments such as the violin, the musicians may not have a free hand because both hands are occupied with either playing the music or holding the instrument. In addition, even if a musician has a moment to turn the pages, it requires him to turn precisely a page and make sure the pages that display the music would stay flat and open for optimal viewing. The motion of turning a physical page with precision causes distraction to the musician's concentration, and it may also affect the overall look-and-feel of the performance.

Therefore, there is a need for an electronic music display that addresses the issues of the conventional methods described above.

SUMMARY

The present invention relates to an electronic music display and methods of using the electronic music display. In one embodiment, the electronic music display includes a user interface configured to receive one or more music files, a memory device configured to store the one or more music files, a controller configured to program the electronic music display in accordance with user specified requirements with respect to order of the one or more music files to be displayed and with respect to tempos that corresponding different sections of the one or more music files to be performed, and a display configured to display a sequence of pages of the one or more music files as programmed.

In another embodiment, a method for displaying music files includes providing an electronic music display, where the electronic music display includes a user interface configured to receive one or more music files, a memory device configured to store the one or more music files, and a display configured to display one or more pages of the one or more music files, programming the electronic music display in accordance with user specified requirements with respect to order of the one or more music files to be displayed and with respect to a plurality of turn page locations corresponding to different sections of the one or more music files to be performed, and displaying a sequence of pages of the one or more music files as programmed in accordance with one or more turn page commands received by the electronic music display.

In yet another embodiment, an electronic music display includes a user interface configured to receive one or more music files, a memory device configured to store the one or more music files, a controller configured to program the electronic music display in accordance with user specified requirements with respect to order of the one or more music files to be displayed and with respect to tempos that corresponding different sections of the one or more music files to be performed, and a display configured to display a sequence of pages of the one or more music files as programmed.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

Like numbers are used throughout the figures.

DESCRIPTION OF EMBODIMENTS

Apparatuses and methods are provided for an electronic music display. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1A:
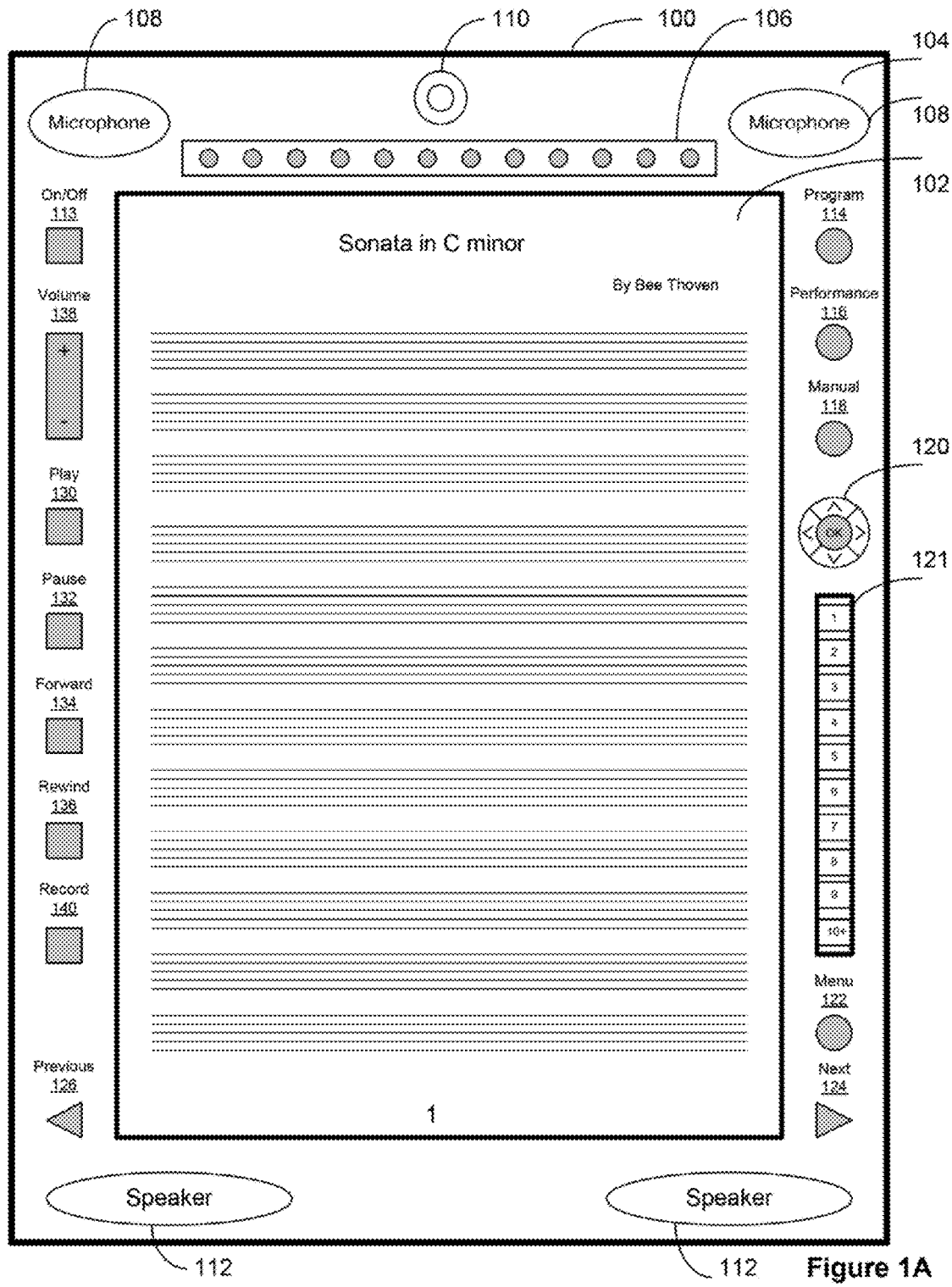
FIG. 1A illustrates an electronic music display according to embodiments of the present invention.

FIG. 1A illustrates an electronic music display according to embodiments of the present invention. In this example, the electronic music display 100 includes a display 102, and a housing 104. The display 102 may be configured to display a page of music score (music not shown), as well as other relevant information about the music, including but not limited to title, composer, and page number. The electronic music display 100 may optionally include a set of light emitting diodes (LEDs) 106 for displaying tempo of a metronome. The electronic music display 100 may also optionally include one or more microphones 108 for audio recording, one or more cameras 110 for video recording, one or more speakers 112 for outputting audio sounds. The electronic music display 100 may further include an on/off button 113, a program button 114 for programming the electronic music display, a performance button 116 for performance mode operation, a manual button 118 for manual mode operation, a navigation button 120, which includes up, down, left, right, and OK/select buttons for navigating the electronic music display, a set of numeral buttons 121 (namely 1 through 10+) for programming music in the electronic music display, a menu button 122 for controlling general settings of the electronic music display, a next button 124 and a previous button 126 for operating the electronic music display in manual mode. The electronic music display 100 may further optionally include play 130, pause 132, forward, 134, rewind 136, and volume 138 buttons for controlling video/audio outputs of the electronic music display. The electronic music display 100 may also optionally include a record button 140 configured to control recording of video (by the camera 110) and/or audio (by the one or more microphones 108).

In another approach, the display 102 may be implemented with an optional touch sensitive screen, which may be configured to control various functions of the electronic music display. For example, the control buttons 114 to 140 may be replaced with corresponding buttons in the display of the touch sensitive screen. In addition, the optional set of LEDs 106 for displaying tempo of a metronome may be implemented with corresponding pulsing signals in the display 102 of the touch sensitive screen.

Figure 1B:
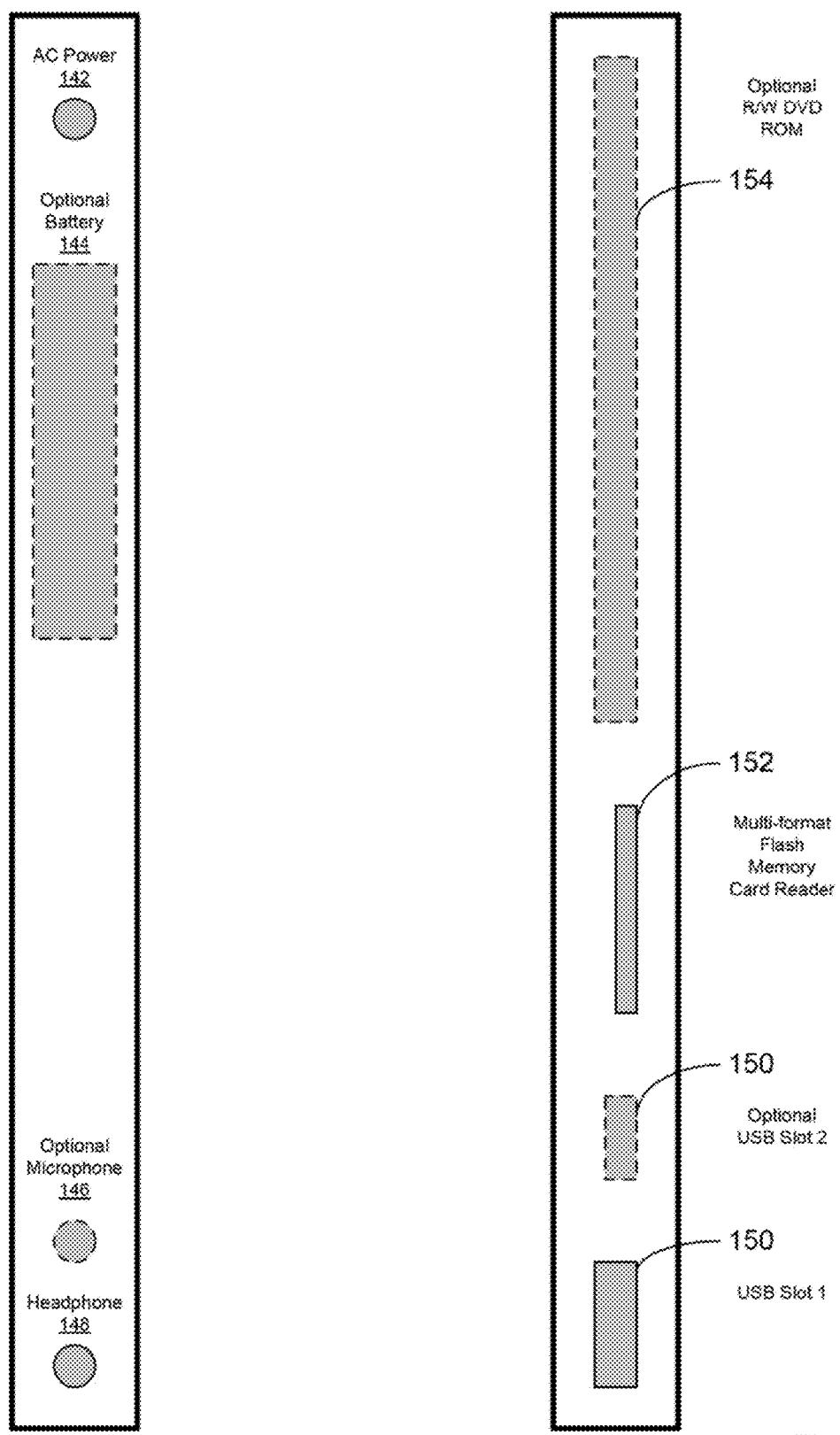
FIG. 1B illustrates side panels of the electronic music display according to embodiments of the present invention.

FIG. 1B illustrates side panels of the electronic music display according to embodiments of the present invention. As shown in FIG. 1B, one side panel of the electronic music display may include an AC power outlet 142 for supplying power to a built-in rechargeable battery, an optional battery slot 144 for using off-the-shelf 1.5V, 6V, or 9V battery or rechargeable battery, an optional microphone jack 146 for connecting to an external microphone, and an optional headphone jack 148 for connect to a headphone set. The other side panel of the electronic music display may include one or more USB slots 150 for interfacing with various USB connector formats, a multi-format memory card reader 152 for interfacing to various flash memory cards, and an optional R/W DVD/CD player 154 for reading from or writing to a DVD/CD disk.

Figure 2A:
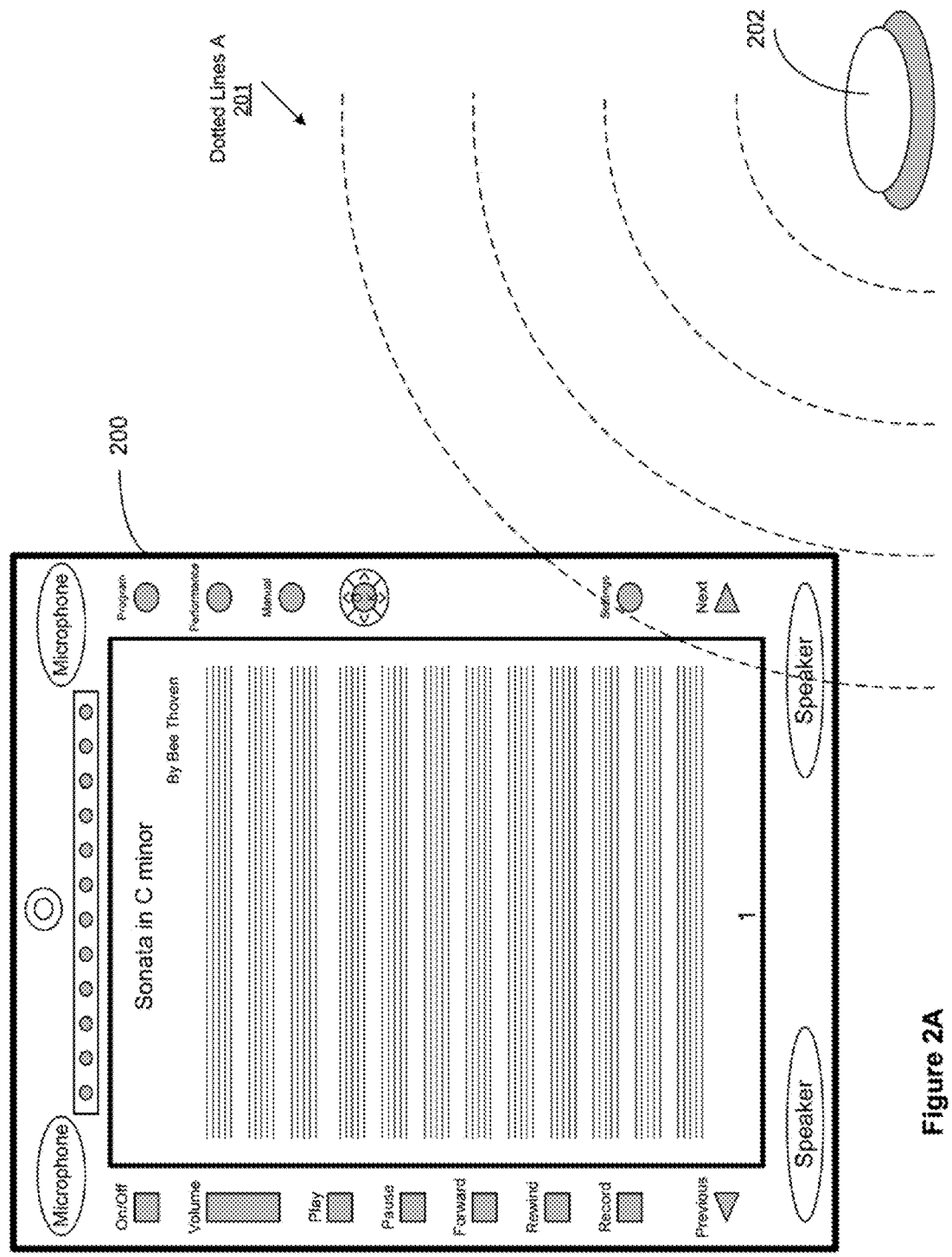
FIG. 2A illustrates a method of communicating between an electronic music display and a remote controller wirelessly according to embodiments of the present invention.

FIG. 2A illustrates a method of communicating between an electronic music display and a remote controller wirelessly according to embodiments of the present invention. In one embodiment, the electronic music display 200 may communicate with a remote controller 202 wirelessly through radio transmissions. The remote controller 202 functions as a transmitter that detects a user command, converts it to a radio signal, and transmits that radio signal (shown as dotted lines A 201). The electronic music display 200 functions as a receiver that receives the radio signal from the remote controller 202, converts it to an electrical signal and which is in turn used to control the display (music not shown) according to the electrical signal received. In this example, the remote controller 202 broadcasts radio signals and the electronic music display 200 receives radio signal broadcasted by the remote controller 202.

Figure 2B:
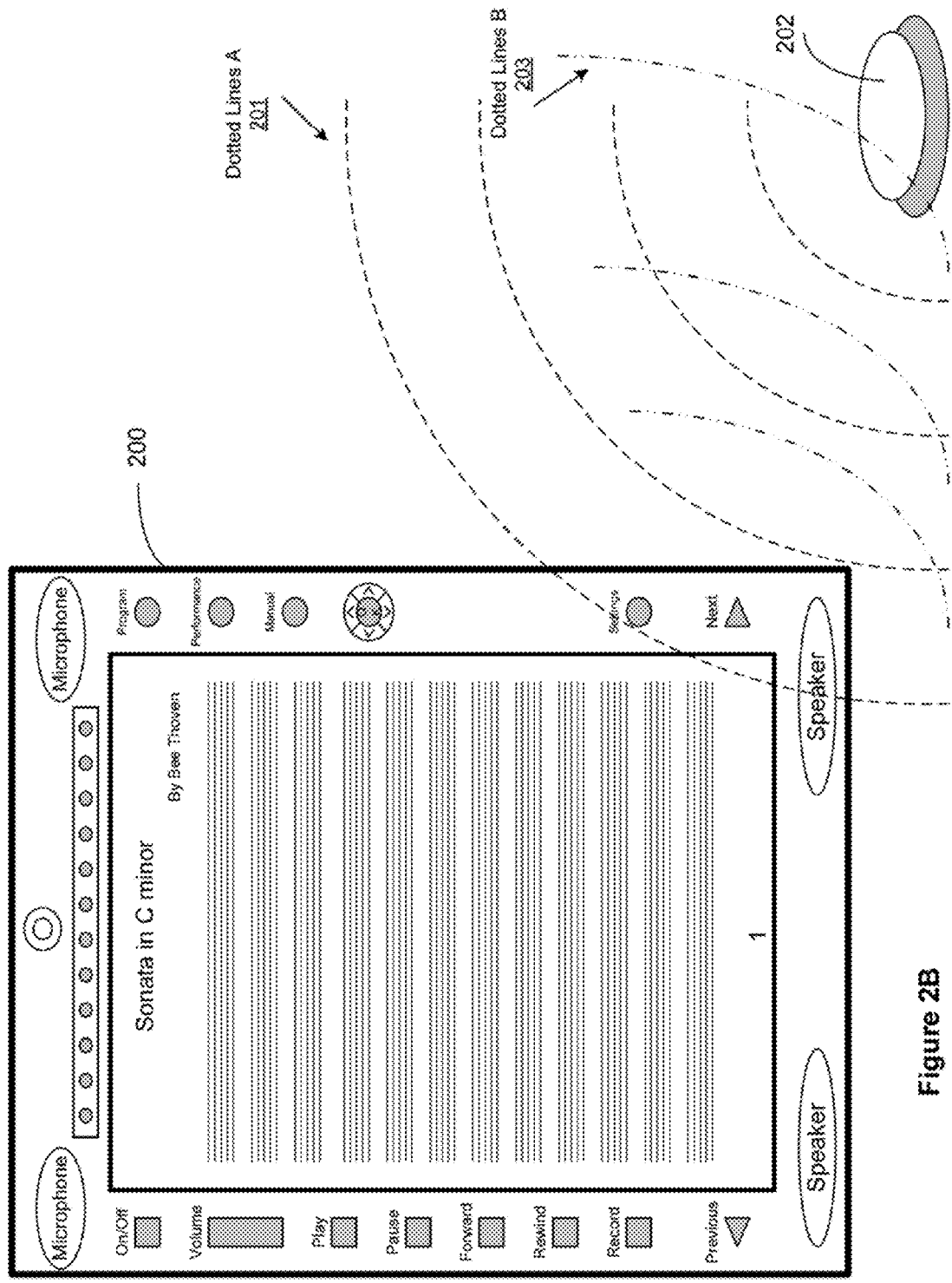
FIG. 2B illustrates another method of communicating between an electronic music display and a remote controller wirelessly according to an embodiment of the present invention.

In a different implementation, the remote controller 202 and the electronic music display 200 may be configured to function both as a transmitter and receiver. As shown in FIG. 2B, dotted lines A illustrates radio signal transmitted by the remote controller 202 and received by the electronic music display. Dotted lines B 203 illustrates radio signal transmitted by the electronic music display 200 and received by the remote controller 202. In such a manner, a bidirectional communication between the remote controller 202 and the electronic music display 200 may be established.

In one approach, the radio communication between the electronic music display 200 and the remote controller 202 may be implemented using the Institute of Electronics and Electrical Engineers (IEEE) 802.11b or 802.11g standard. With the IEEE 802.11b or 802.11g standard, the radio signal frequency operates at 2.4 gigahertz. At this frequency, data can be transmitted between the devices at fairly high speed, usually either at 11 Mbps or 56 Mbps. The 2.4 gigahertz frequency is stable and usually has little or no interference in a theater or home environment. This implementation gives an operating range of about 100 to 150 feet, which is sufficient for many of the electronic music display applications.

In another approach, the radio communication between the electronic music display 200 and the remote controller may be implemented using the Bluetooth technology. The Bluetooth technology may be employed to communicate between an electronic music display with the wireless remote controller, a wireless headset, as well as other electronic music displays. The Bluetooth technology is similar to IEEE 802.11b and 802.11g standards in that it uses 2.4 gigahertz frequencies, however, it also uses software called adaptive frequency hopping to choose frequencies that have no or little interference. Sometimes IEEE 802.11b 802.11g may receive interference from home appliances such as microwave ovens and cordless telephones. The Bluetooth technology has an operating range about 33 feet, which is usually enough for the electronic music display applications.

Figure 2C:
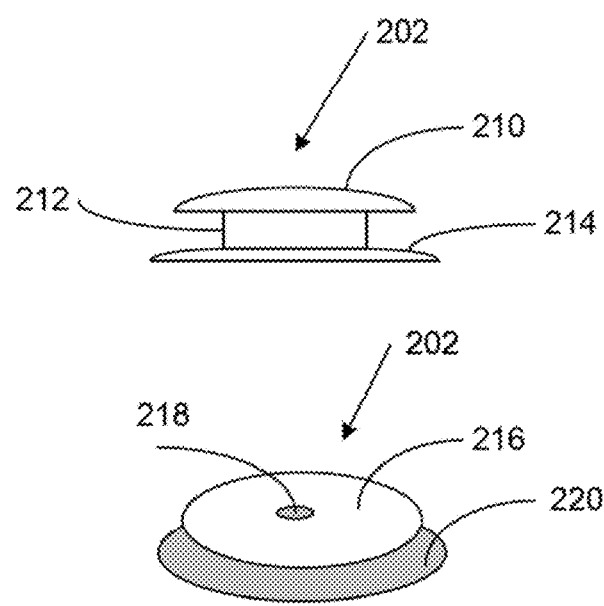
FIG. 2C illustrates an implementation of a remote controller according to embodiments of the present invention.

FIG. 2C illustrates an implementation of a remote controller according to embodiments of the present invention. As shown in FIG. 2C, the remote controller 202 includes a top section 210, a middle section 212, and a bottom section 214. The top section 210 includes a sensor 216 for sensing commands from a user. The top section 210 may further include a power indicator 218, which may be configured to show the remote controller is powered on. The power indicator 218 may be made with different color light emitting diodes (LEDs) to show the amount of battery remaining in the remote controller. For example, a green light may indicate the battery is full or near full. A yellow light may indicate the battery is about half full; and a red light may indicate the battery is low (for example less than 20%) and the user should change or recharge the battery. The middle section includes electronics (not shown) for transmitting or receiving signals to or from the electronic music display. The middle section further includes a battery (not shown) for supplying power to operate the remote controller. The bottom section includes support member for providing support to the remote controller. The support member may be constructed with flexible rubber or plastic material in the shape of an inverted suction cup 220 such that it creates suction to a flat surface to hold the remote controller firmly in one place.

Note that FIG. 2C illustrates an implementation of a one-button remote controller. In other approaches, a multiple-button remote controller may be implemented. For example, a two-button remote controller may include a next (forward) button and a previous (back) button. A three-button remote controller may include a next (forward) button, a previous (back) button, and a reset or stop button. The tradeoff between a single button implementation and multi-button implementation lies in the balance of cost, functionality, and ease-of-use. In a situation where a musician's attention is primarily focused on his performance and he may be nervous on stage, a single-button remote controller may be easier to use than a multi-button remote controller.

Note that the remote controller may be constructed to be operated by foot or by hand. In the case the remote controller is operated by foot, a pressure or mechanical sensor may be employed to detect a force applied by foot. In the case the remote controller is operated by hand, in addition to pressure or mechanical sensors, other types of touch sensors, such as capacitive or resistive sensors may be employed to detect a touch by the hand of a user. A remote controller to be operated by foot is usually larger than a remote controller to be operated by hand because a larger target may be easier to use. For example, a foot operated remote controller may have a diameter, or diagonal measurement for non-circular shapes, larger than one inch. On the other hand, a hand operated remote controller may have a diameter, or diagonal measurement for non-circular shapes, smaller than two inches so that it would be easier to place the hand operated remote controller at a location accessible by hand during a performance.

There are a few benefits using wireless communication between the electronic music display 200 and the remote controller 202. First, it eliminates the clumsy wire (cord) that connects between the two devices so that it is easier to use and it presents an aesthetically cleaner solution. Second, the RF wireless technology is stable and reliable. Other forms of communication such as Infrared technology would require the two devices to be in "line of sight" in order to work properly which makes such infrared device impractical to use. Third, the wireless technology requires low power. The electronic music display and especially the remote controller may be powered by small, light weight batteries that are either disposable or rechargeable. Last but not least, the RF wireless technology is lightweight, which means a user can carry them around comfortably and easily.

Figure 3A:
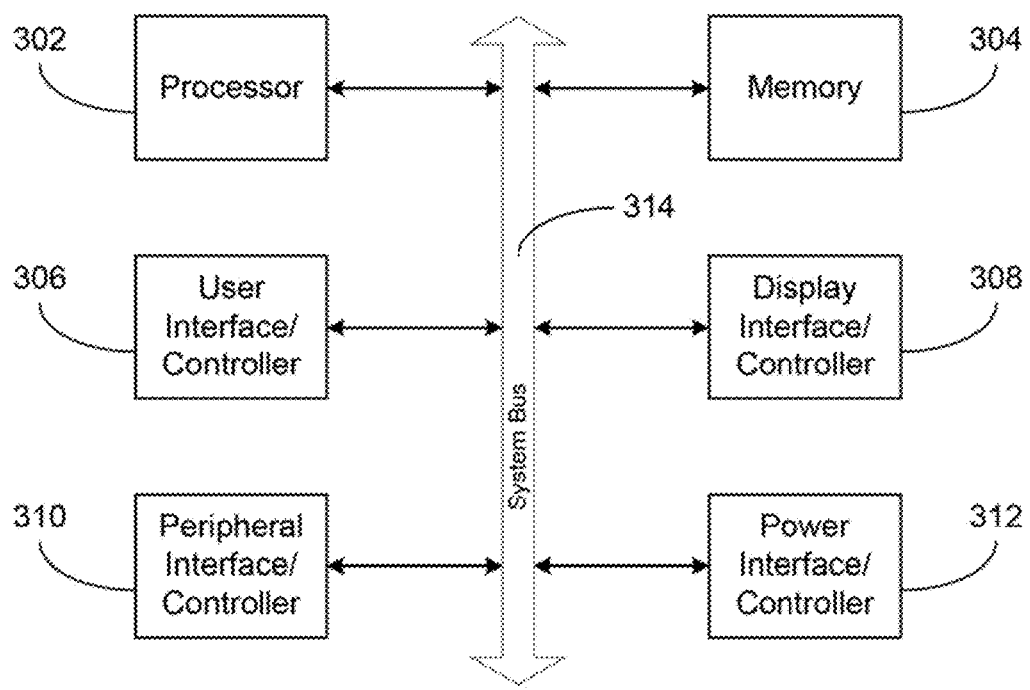
FIG. 3A illustrates a block diagram of an electronic music display according to embodiments of the present invention.

FIG. 3A illustrates a block diagram of an electronic music display according to embodiments of the present invention. In this example, the electronic music display includes a processor 302, a memory 304, a user interface/controller 306, a display interface/controller 308, a peripheral interface/controller 310, and a power interface/controller 312. The electronic music display further includes a system bus 314 that is configured to communicate information between processor 302, memory 304, user interface/controller 306, display interface/controller 308, peripheral interface/controller 310, and power interface/controller 312.

Figure 3B:
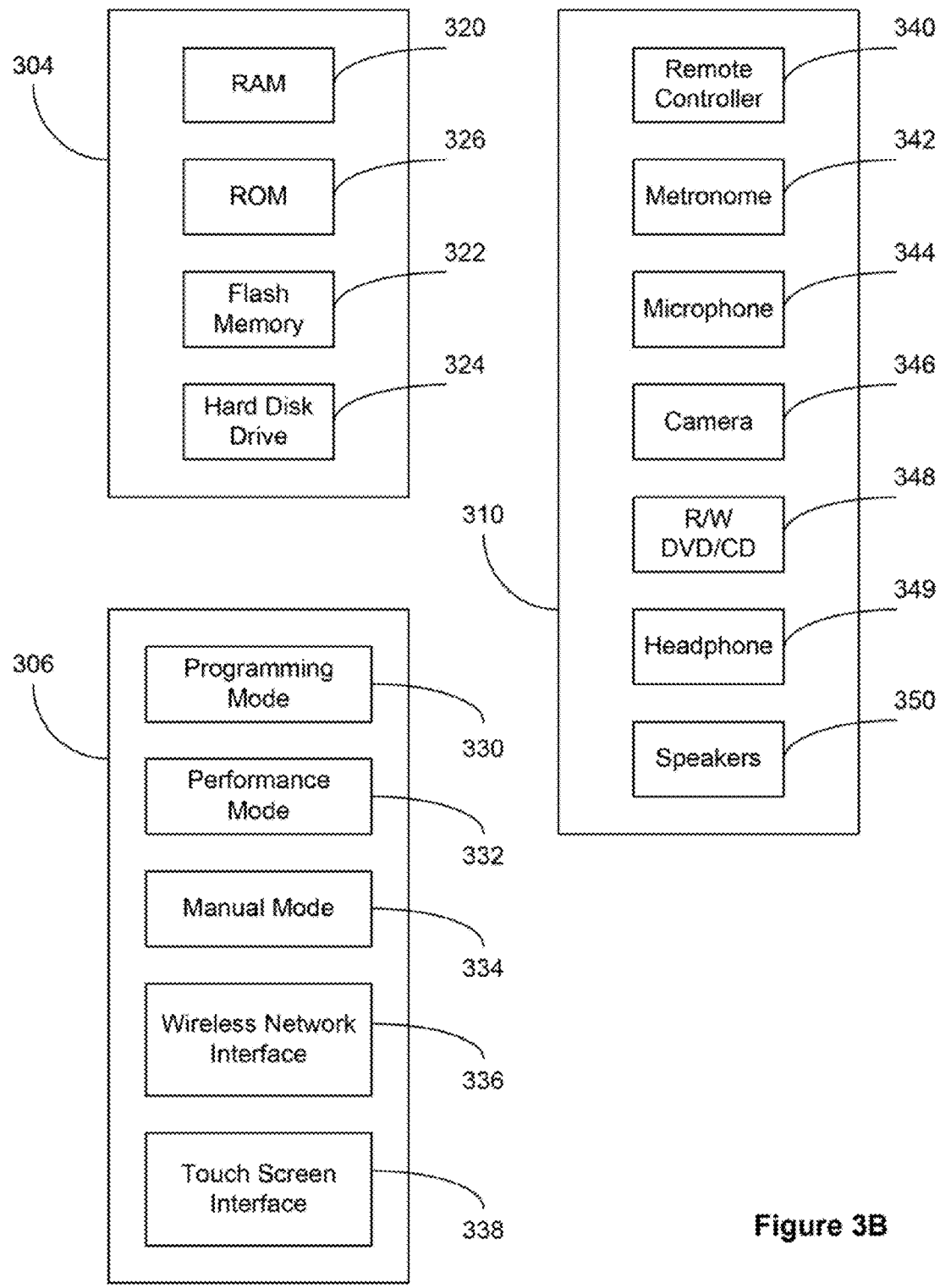
FIG. 3B illustrates elements of the electronic music display of FIG. 3A according to embodiments of the present invention.

FIG. 3B illustrates elements of the electronic music display of FIG. 3A according to embodiments of the present invention. In this example, the memory 304 may include a random access memory (RAM) 320, a flash memory 322, and may optionally include a hard disk drive 324, and a read-only-memory (ROM) 326. The user interface/controller 306 may include a programming mode 330, a performance mode 332, a manual mode 334, and may optionally include a wireless network interface 336, and a touch screen interface 338. The peripheral interface/controller 310 may include remote controller interface 340, and may optionally include metronome 342, microphones 344, camera 346, read/writeable DVD/CD player 348, headphone 349, and speakers 350. The electronic music display may optionally include a wireless Internet connection that allows the user to search and download related music and video from the Internet, such as from YouTube or iTune. The electronic music display may optionally include a pen that allows the user to make annotations, and to take notes about the piece of music he is practicing on the touch screen display.

In one application, the user may use stereo microphones to make audio recordings of the music being played; and similarly the user may use the built-in video camera to make video recordings of the music being played. The capability to make audio and/or video recordings is particularly helpful for students taking music lessons. Often, a student may not be able to remember or correctly understand instructions of his music teacher. With the help of audio/video recordings, the student may be able to review his class again by watching the video or listening to the audio of the recorded class on the electronic music display. This approach is much better than recording using a camcorder and display the recorded class on a television or in a computer. With the electronic music display, the student can view the recorded class wherever he chooses such as in front of his music instrument, as it is more efficient for him to review the recorded class and view the music score together. In addition, the electronic music display has a better angle for video recording because the camera is right in front of the student and teacher as opposed to filming from the side, and the view of the student is not blocked by the music instrument (such as the piano), the music stand, and the music sheets on the music stand.

In another application, the user may learn to play a piece of music by playing-along using a corresponding piece of the music previously recorded by a professional musician. The corresponding piece of music (which is also referred to as the reference music) may be downloaded or imported to the electronic music display from the Internet, from the USB port, or from a CD or DVD player. The user may set the tempo of the music to be played with the built-in metronome. The electronic music display may be configured to play the reference music to match a tempo set by the user while still matching pitch and tune of the reference music. If the user prefers to listen to the reference music while playing along, he may use a wireless headphone that will tune to the audio output of the electronic music player instead of listening to the sound of music generated by his own playing. Furthermore, after playing-along, the electronic music display may be configured to compare the reference music and the music played by the user side-by-side, highlighting differences between the music performed by the user to the reference music. In this way, the user may quickly identify areas he needs to improve.

In yet another application, the user may play-along with a piece of reference music video from a DVD or downloaded from the Internet (e.g. YouTube). The electronic music display may use one part of the screen to display the music video to match a tempo set by the user with the matching video rate and sound, and use another part of the screen to display the music score for turning the pages of the music for the user. In this way, the user may learn the ways of music interpretation and movements from the (professional) musician in the music video.

Figure 4A:
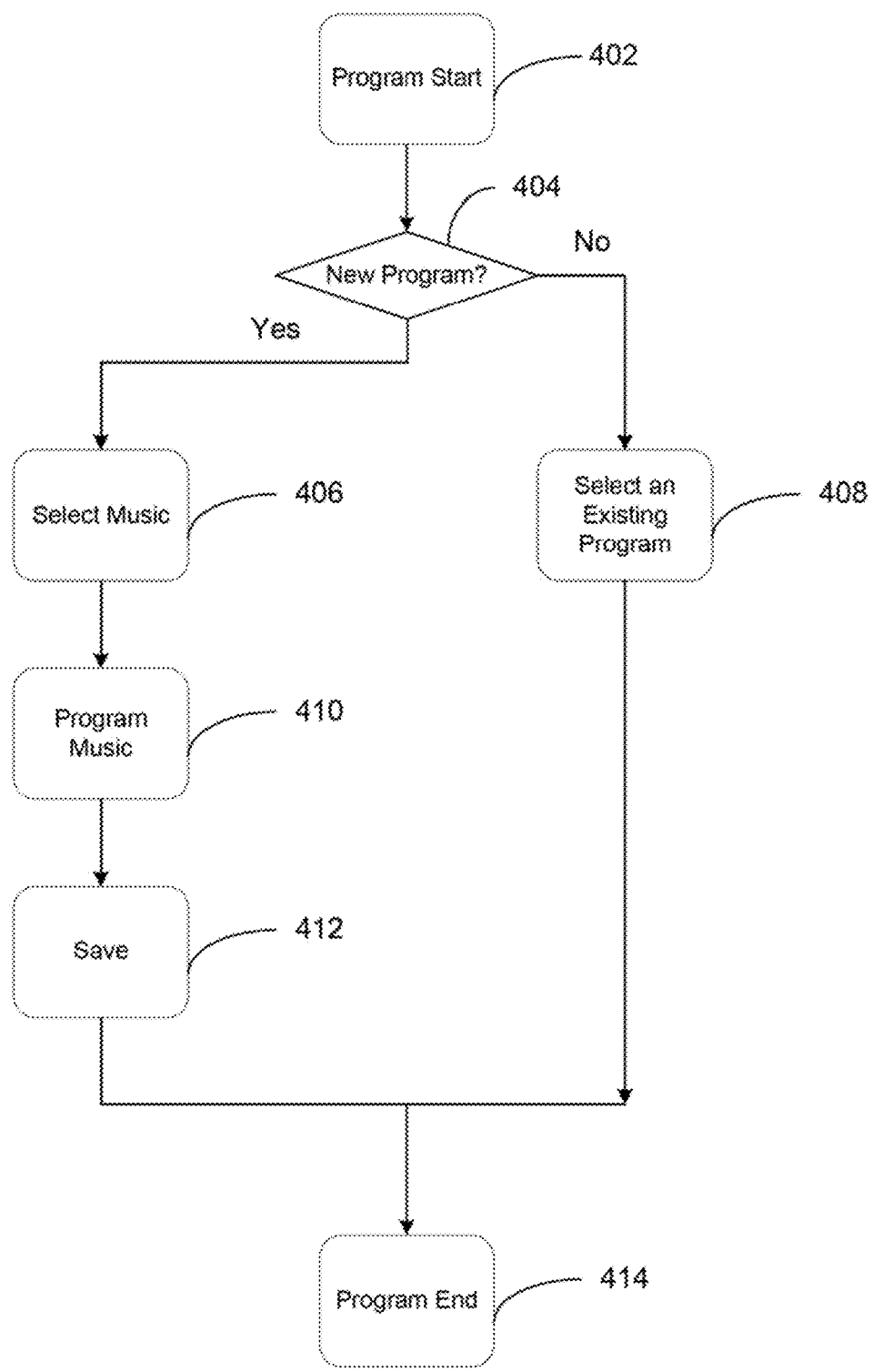
FIG. 4A illustrates a method for using the electronic music display according to embodiments of the present invention.

FIG. 4A illustrates a method for using the programming mode of the electronic music display according to embodiments of the present invention. In this example, the method starts in block 402 and moves to block 404 where a first inquiry is made as whether to create a new program. If the user desires to create a new program (404_yes), the method moves to block 406. Alternatively, if the user desires not to create a new program (404_no), the method moves to block 408 where the user may select an existing program to perform. After block 408, the method ends in block 414. In block 406, the method guides the user to select music he wishes to program. In block 410, the method guides the user to program the music he selected in block 406. In block 412, the method saves the programmed music. After block 412, the method ends in block 414.

Figure 4B:
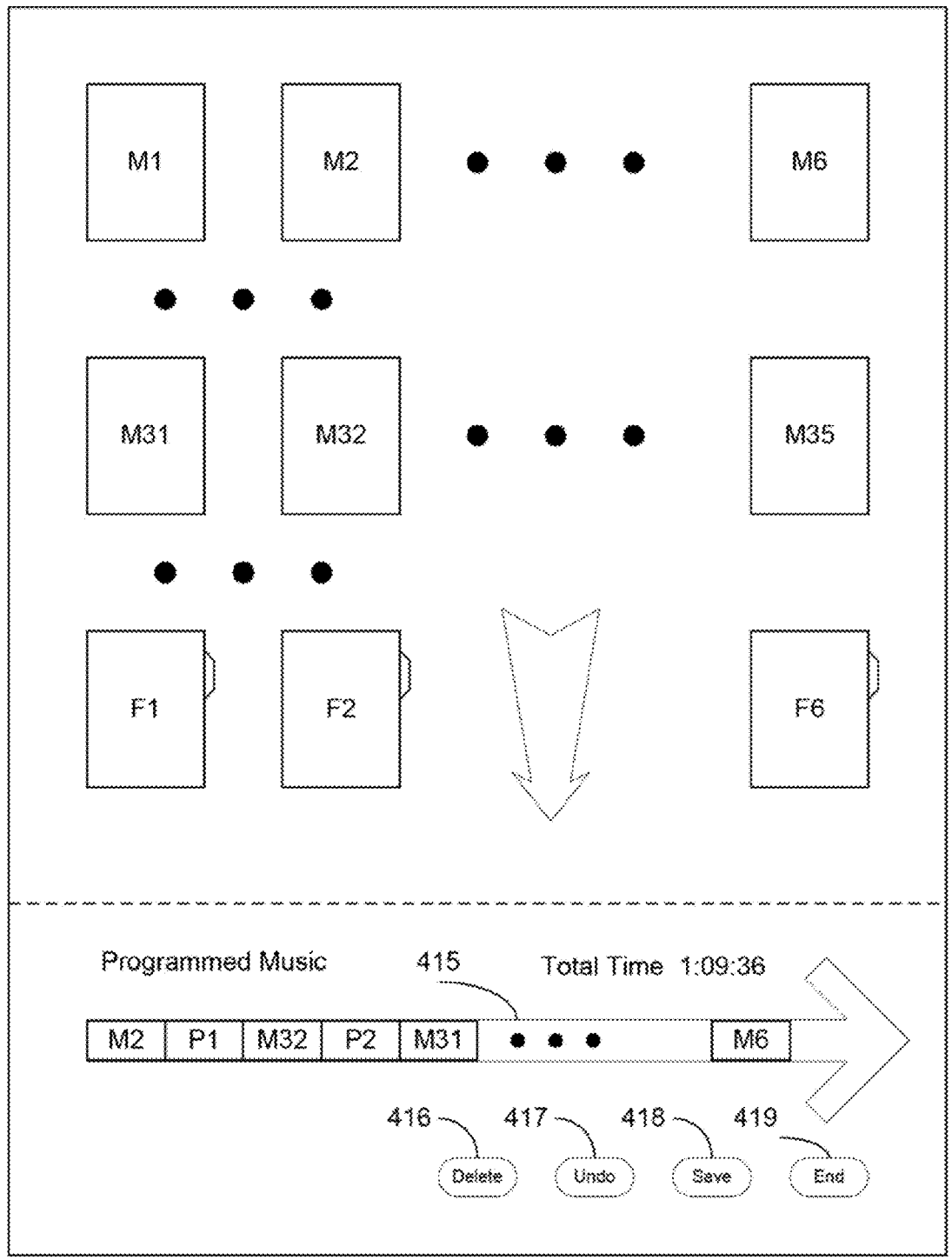
FIG. 4B illustrates methods for selecting and programming music using an electronic music display according to embodiments of the present invention.

FIG. 4B illustrates methods for selecting and programming music using an electronic music display according to embodiments of the present invention. As shown in FIG. 4B, in the programming mode, the user interface may split the display into two sections. A first section displays folders (shown as F1, F2, etc.) and files (shown as M1, M2, etc.) of music. A second section displays a sequence of music to be programmed for performance. For example, a user may select and drag the music file M2 from the first section to the second section as the first piece of music to be performed, M32 as the second piece, M31 as the third piece, and M6 as the last piece of music to be performed. The user may also insert a pause between pieces of music, such as P1 inserted between M2 and M32, and P2 between M32 and M31. Each pause, such as P1 or P2, is a period of time programmable by the user. A timeline 415 shows the sequence of music being programmed and to be performed. In addition, a total time of the programmed performance is shown to give the user an estimate of the total duration of time of the programmed performance, which is 1 hour 9 minutes and 36 seconds in the example shown in FIG. 4B. The user may modify a programmed sequence of music by selecting and deleting (by using the delete button 416) a particular piece of music (e.g. M32) or a pause (e.g. P2); the user may also insert other pieces of music to any location of the timeline 415; and the user may change order of the programmed music by drag and drop any piece of music to a different location on the timeline 415. The user may undo a previous operation by clicking the undo button 417, he may save the programmed music by clicking the save button 418, and he may end the programming by clicking the end button 419.

Figure 4C:
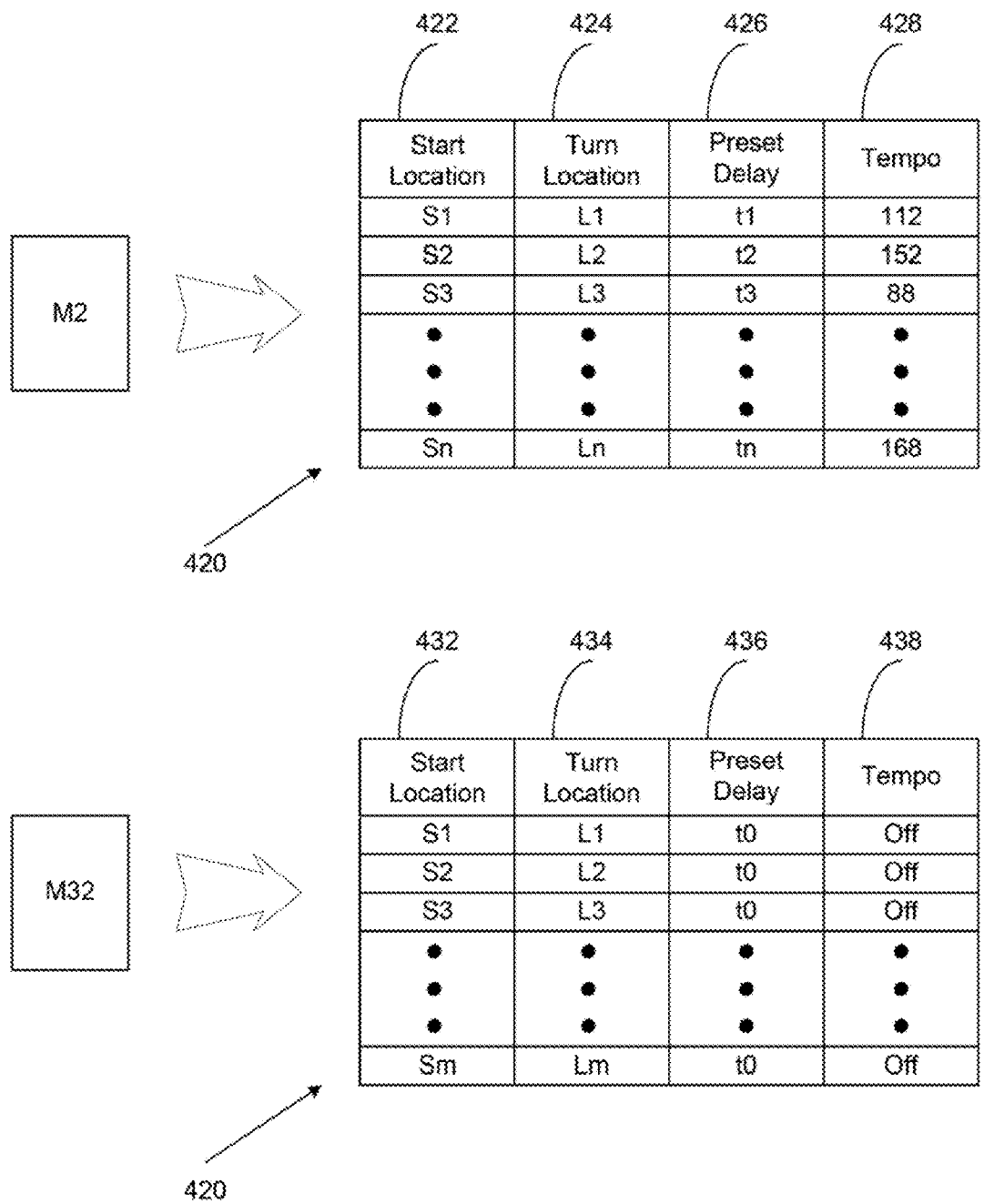
FIG. 4C illustrates methods for programming pieces of music according to embodiments of the present invention.

FIG. 4C illustrates methods for programming pieces of music according to embodiments of the present invention. In this example, a user interface in the form of a table is provided for the ease of programming of each piece of music. Each table 420 includes a set of start locations (also known as start page locations) which indicates the locations on each page of music where the user starts playing, a corresponding set of turn locations (also known as turn page locations) indicating where the user needs to turn the page. For each pair of start and turn locations, the user may program a corresponding preset delay for indicating the threshold period of time delay before the next turn page command may be deemed effective. Each preset delay may be the same or different from the other preset delays. Furthermore for each pair of start and turn locations, the user may program a corresponding tempo for the section of music to be performed from the start location to the turn location. In the special case where a piece of music has only one page, there is one pair of start and turn locations, one preset delay, and one tempo to be programmed. At the last turn location of a piece of music, a turn-page command generated by a user would cause the display to show the first page of the next piece of music in the sequence as programmed in FIG. 4B. Except that at the last location of the last piece of music in the sequence as programmed in FIG. 4B, a turn-page command by the user would cause the display to show a page indicating the end of the performance according to the user's preference.

In the examples shown in FIG. 4C, the piece of music M2 is programmed with a set of start locations 422 S1 to Sn, corresponding set of turn locations 424 L1 to Ln; corresponding set of preset delays 426 t1 to tn; and corresponding set of tempos 428, such as 112, 152, 88, . . . and 168. The different entries for the preset delays allow the user to adjust the amount of delay according to the specific requirements of each piece of music. The different entries of tempos allow the electronic music display to guide the user to accurately perform certain sections of the music at the correct tempo with a metronome. For example, if a piece of music has multiple sections/variations, each section/variation may be played at a specific preprogrammed tempo. Note that the preset delay and tempo of a piece of music may be programmed separately and independent of each other.

Similarly, the piece of music M32 is programmed with a set of start locations 432 S1 to Sm and corresponding turn locations 434 L1 to Lm. For the case of M32, all the preset delays 436 are programmed to t0, for example 3 seconds, which may be a default threshold period of time delay before the next turn-page command is deemed effective. The use of the default threshold may simplify the programming when there are no specific requirements for the piece of music and certain default preset delay would work for all turn-page commands throughout the piece of music. Also for the case of M32, the user may choose to turn off the tempo 438 such that the electronic music display would not show the tempo of various sections of the music during the performance. In the default mode, the tempo is off such that the display of metronome by the electronic music display is off. Turing off the metronome may be preferred by more experienced users and may be desirable where playing each measure accurately according to the metronome is not required by the music.

Figure 5A:
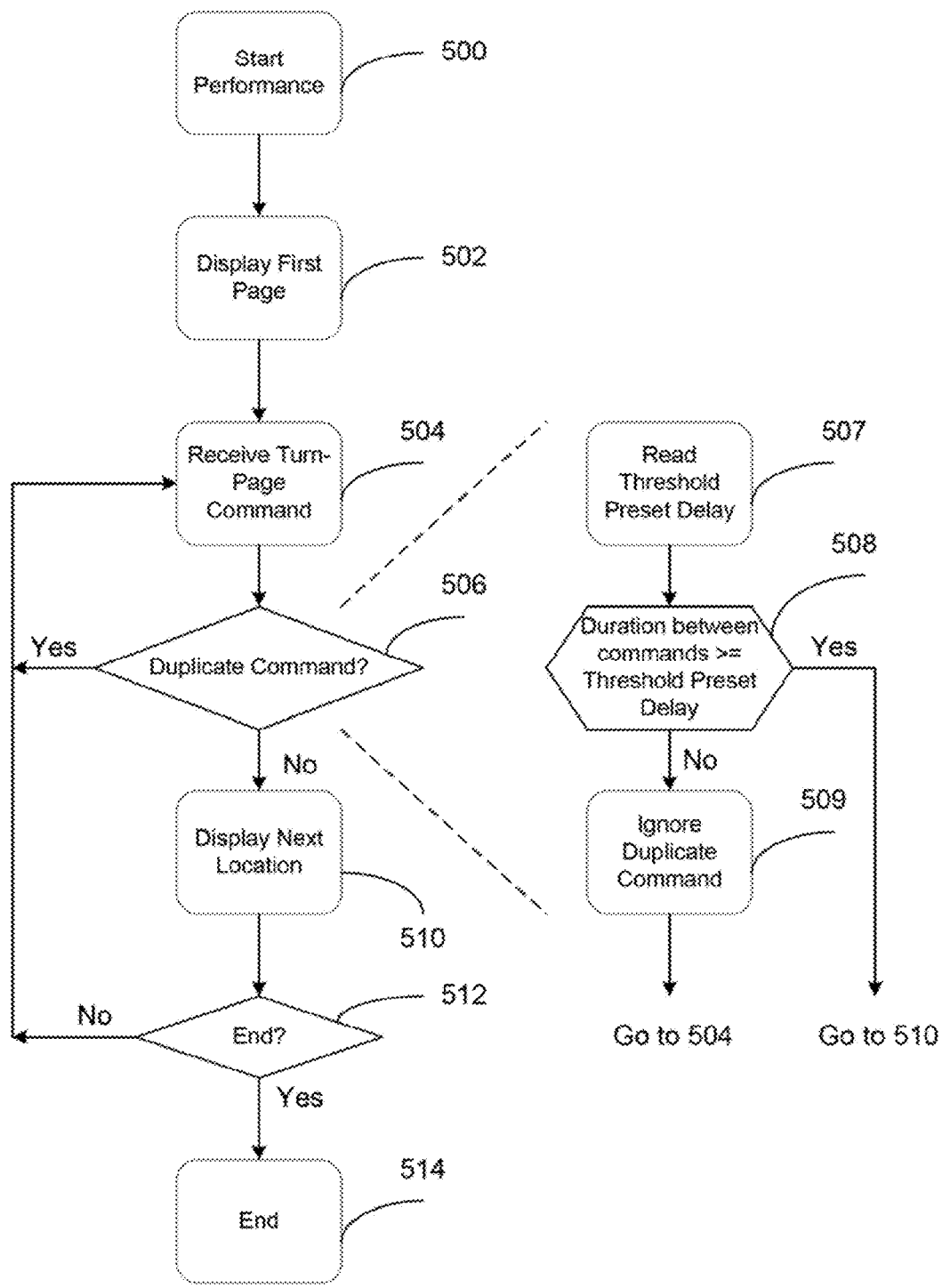
FIG. 5A illustrates a method for using the electronic music display for performance according to embodiments of the present invention.

FIG. 5A illustrates a method for using the electronic music display for performance according to embodiments of the present invention. Note that the electronic music display is used after a user has programmed her selection of music for her performance according to the method described in FIGS. 4A-4C. As shown in FIG. 5A, the method starts in block 500 and moves to block 502 where a first page of the sequence of music to be performed is displayed. In block 504, the method waits to receive a turn-page command. During performance, the turn-page command may be generated by a remote controller in the form of a radio signal as described in FIGS. 2A-2C. Upon receiving the turn-page command, the method moves to block 506 where a first determination is made as to whether the command is a duplicate command. If the command received is a duplicate command (506_yes), the method returns to block 504 and continue to wait for the next command. Alternatively, if the command received is not a duplicate command (506_no), the method moves to block 510 where the electronic music display displays a next location of the music score in the sequence of music to be performed. Note that the command may be issued by the user/musician, such as through a remote controller operated by foot or by hand. In another approach, the command may be issued by a third person appointed by the user, also through a remote controller operated by foot or by hand. One benefit of the current invention is that the third person operating the remote controller does not need to be on-stage with the user/musician. Rather, the third person may be positioned in a location within the wireless signal transmission range required (e.g. by Bluetooth or other types of radio transmission) between the electronic music display and the remote controller. Note that the next location being displayed may or may not be the next physical page of the music. As shown in the examples below, in FIG. 6A, the next location is the next physical page (transitioning from page 1 to page 2), while in FIG. 6B, the next location is not the next physical page (transitioning from page 6 to page 4).

The determination of a duplicate command in block 506 is further described with blocks 507-509. In block 507, the method reads a threshold preset delay (for example 4 seconds) for the current section of music being performed as programmed by the user according to FIG. 4C. In block 508, the method compares the duration between the current command and the previous command to the threshold preset delay programmed. If the duration between the current command and previous command is greater than or equal to the threshold preset delay for the current page location, the command is deemed to be valid and the method moves to block 510 to display a next location of the music score. On the other hand, if the duration between the current command and previous command is less than the threshold preset delay for the current page location, the command is deemed to be a duplicate command, and the method ignores the duplicate command in block 509 and then moves to block 504 and continues to wait for the next user command.

In block 512, a second determination is made as to whether it is the end of the sequence of music being performed. If the performance has not reached the end (512_no), the method moves to block 504 and waits for the next user command. Alternatively, if the performance has reached the end according to the programming done in FIGS. 4A-4C (512_yes), the method moves to block 514 and ends the performance.

Figure 5B:
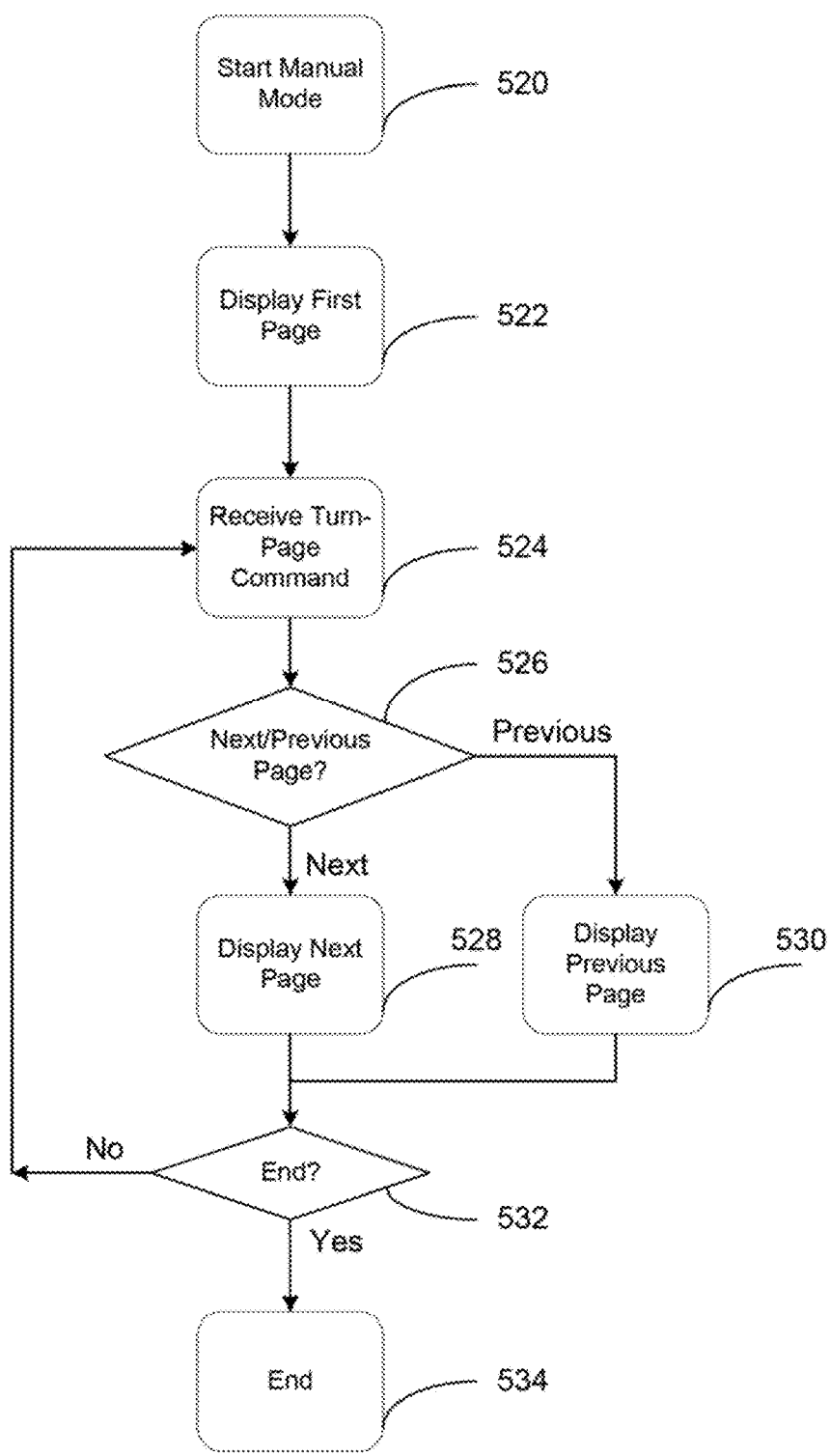
FIG. 5B illustrates a method for using the electronic music display in manual mode according to embodiments of the present invention.

FIG. 5B illustrates a method for using the electronic music display in manual mode according to embodiments of the present invention. Note that the manual mode is typically used in a non-performance setting where it is acceptable to be interrupted from playing the music and turn the pages manually. A user may find this mode useful when not playing an entire piece or entire performance from start to end; rather the user practices certain sections of the music back and forth multiple times. This mode may also be useful when it is desirable to overwrite a pre-programmed sequence of music and change the performance to a new sequence in certain situations.

As shown in FIG. 5B, the method starts in block 520 and moves to block 522 where a first page of the sequence of music to be played is displayed. In block 524, the method waits to receive a turn-page command from the user. In the manual mode, the command may be generated by pressing a next page button or a previous page button. Upon receiving the turn-page command, the method moves to block 526 where a first determination is made as to whether the command is a next page or previous page command. If the user command received is a next page command, the method moves to block 528 and displays the next page of the music score. Alternatively, if the user command received is a previous page command, the method moves to block 530 and displays the previous page of the music score in the sequence of music to be played.

In block 532, a second determination is made as to whether it is the end of the sequence of music to be played. If the music has not reached the end (532_no), the method moves to block 524 and waits for the next user command. Alternatively, if the music has reached the end, the method moves to block 534 and ends the display of the music score.

Figure 5C:
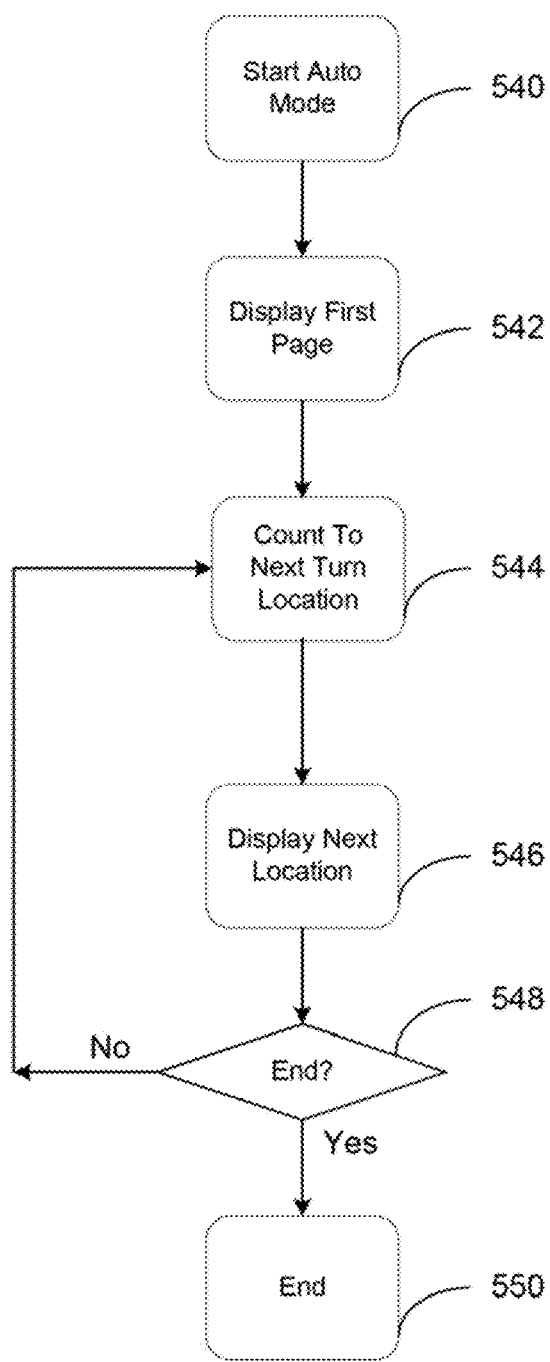
FIG. 5C illustrates a method for using the electronic music display in auto mode according to embodiments of the present invention.

FIG. 5C illustrates a method for using the electronic music display in auto mode according to embodiments of the present invention. Note that the auto mode is typically used after a user has programmed the music of her performance according to the method described in FIGS. 4A-4C. In the approach shown in FIG. 5C, the method starts in block 540 and moves to block 542 where a first page of the sequence of music to be performed is displayed. In block 544, the method counts the performance time elapsed to the next turn page location using the music score and preprogrammed information provided by the user. Specifically, in the methods described earlier associated with FIGS. 4A-4C, the user has marked a section of music to be performed with a start location and a turn location. In addition, the user has programmed a corresponding tempo for the section of music to be performed. With this information, the method may determine the amount of time required for the user to perform from the start location to the turn location, which equals to the number of measures in the section of music multiply by the time required to perform each measure, which may be obtained by using the preprogrammed tempo. Thus, the method is able to count the amount of time elapsed to the next turn page location. In block 546, upon reaching the next turn page location, the method displays the next location of the music being performed. In block 548, a determination is made as to whether the performance has reached the end. If the performance has reached the end (548_yes), the method moves to block 550 and ends the display of the music score. Alternatively, if the performance has not reached the end (548_no), the method moves to block 544 and continues to count the amount of time elapsed to the next turn page location. In such a way, the electronic music display displays and turns the music sheets being performed automatically according to the user's preprogrammed criteria.

Figure 6A:
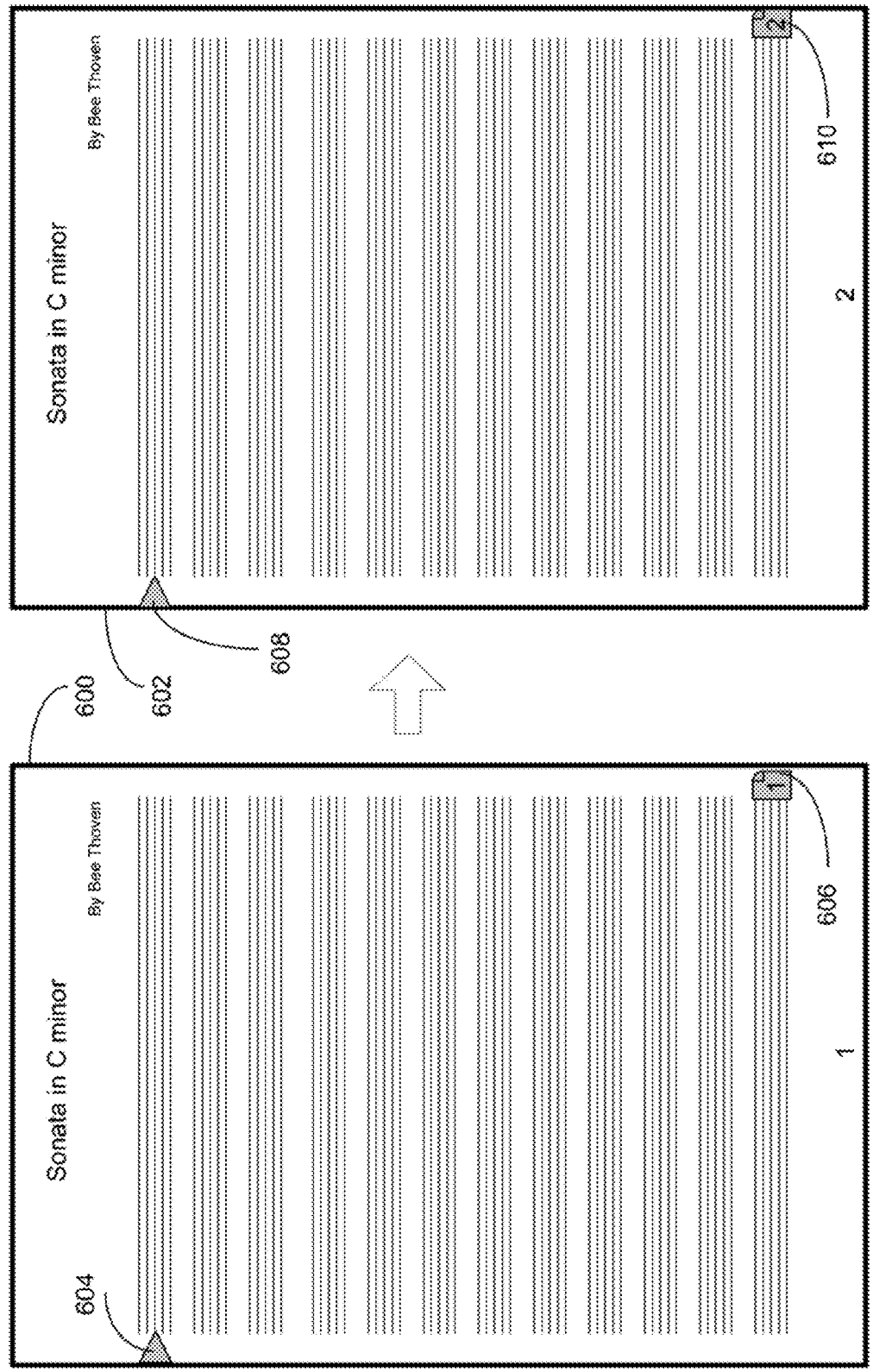
FIG. 6A illustrates a method for transitioning from one page to another page according to embodiments of the present invention.

FIG. 6A illustrates a method for transitioning from one page to another page according to embodiments of the present invention. As shown in FIG. 6A, the method transitions from displaying the first page 600 to the second page 602 of a piece of music. A first start location indicator 604 is displayed at the beginning of the music. At the beginning of the performance, this first start location indicator 604 may be programmed to flash a predetermined number of seconds (for example 4 seconds) to allow the musician to synchronize his timing with the electronic music display. Optionally, the color of the start location indicator may change to indicate the progression of the synchronization. For example, if the start location indicator flashes 4 times for a 4 second synchronization, the color of the start location indicator may flash red, orange, yellow, and green. This way, the musician is synchronized with the electronic music display. This is particularly useful if the musician uses the built-in metronome and/or uses the auto mode of the electronic music display to turn pages of the music using the preprogrammed tempo as described in association with FIG. 5C.

At the bottom of page 1, a first turn location indicator 606 is displayed. In the auto mode, the first turn location indicator 606 is used by the electronic music display to determine where the page is to be turned (i.e. the next page is to be displayed) in association with the auto mode as described in FIG. 5C. In the situation where the musician prefers to turn the page himself, the first turn location indicator 606 is used to remind the musician to issue a turn-page command.

At page 2, the method uses a second start location indicator 608 at the beginning of the second page to show the musician the starting point of the music after the second page is displayed. It is advantages to employ the start location indicators to let the musician know where to look after a new page is displayed. Although the musician no longer use the second location indicator for synchronization purposes, it may still be beneficial to flash the second location indicator for another predetermined period of time for identifying the starting location of a new page, for example the second start location indicator 606 may be configured to flash green light for 2 seconds (twice) to achieve the benefits stated above. The second turn page indicator 610 is configured to work in a similar manner as the first turn page location indicator 606. Note that a numeral 1 is labeled with the first turn page indicator 606 and a numeral 2 is labeled with the second turn page indicator 610. These numerals are used to indicate the sequence of page turns in a piece of music. These numerals may be inserted when programming each piece of music by using the numeral pad 121 shown in FIG. 1A.

Figure 6B:
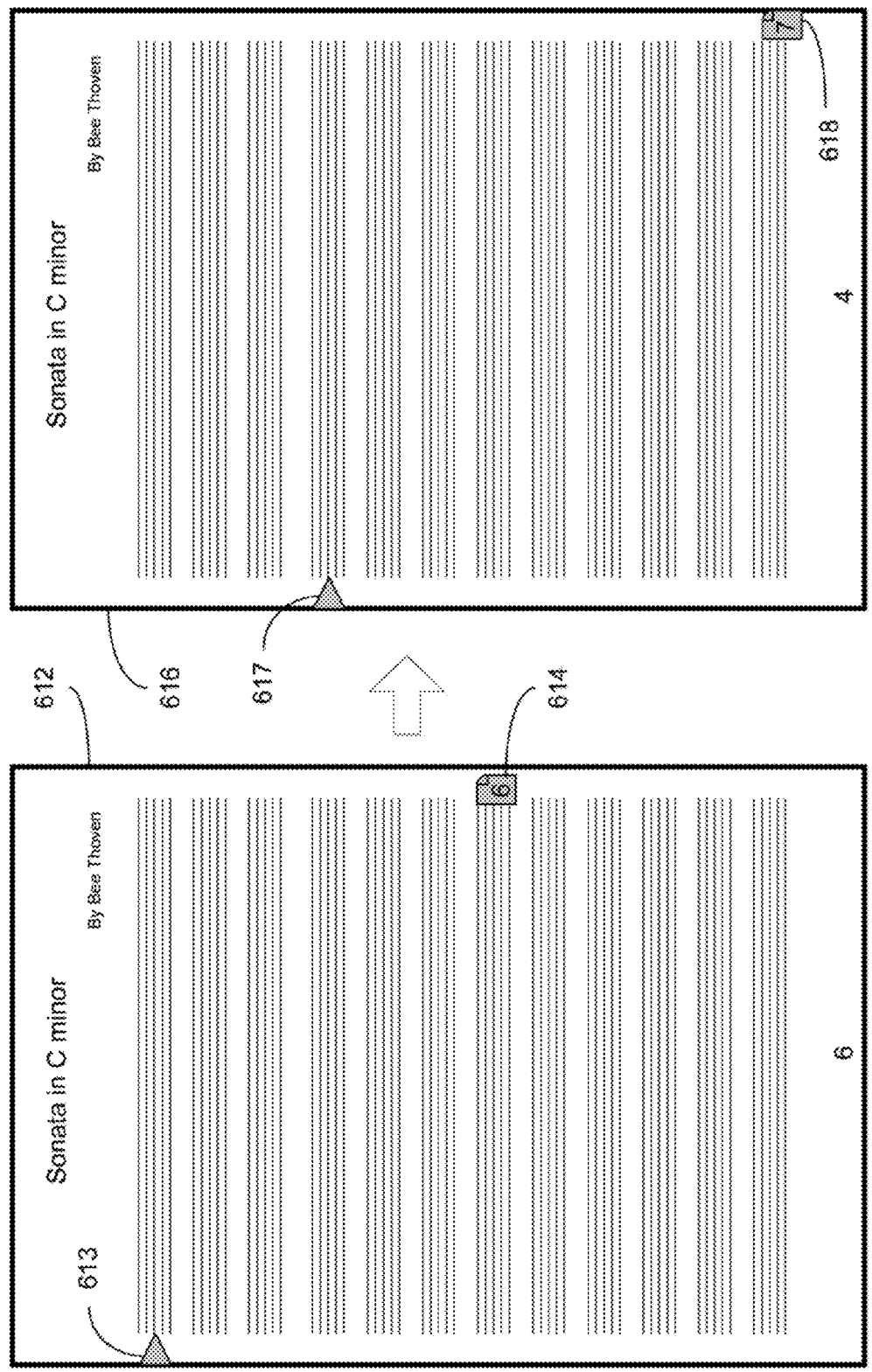
FIG. 6B illustrates another method of transitioning from one page to another page according to embodiments of the present invention.

FIG. 6B illustrates another method of transitioning from one page to another page according to embodiments of the present invention. In this example, the user is playing page 6 (612) and needs to turn back to page 4 (616) to repeat certain section of the music. Similar to the method shown in FIG. 6A, a first start location indicator 613 is displayed at the beginning of page 6. At the beginning of page 6 (assuming transitioned from page 5, which is not shown), this first start location indicator 613 maybe programmed to flash a predetermined number of seconds (for example 2 seconds) to bring the musician's attention to the starting location of the music on page 6.

Near the mid section of page 6, a first turn location indicator 614 is displayed. In the auto mode, the first turn location indicator 614 is used by the electronic music display to determine where the page is to be turned (i.e. the next page is displayed) as described in association with FIG. 5C. In the situation where the musician prefers to turn the page himself, the first turn location indicator 614 is used to remind the musician to issue a turn-page command. On page 4, a second start location indicator 617 near to mid section of page 4 is used to show the musician the starting point of the music after page 4 is displayed. Similarly, a second turn page indicator 618 is used to indicate the location where page 4 is turned. Note that, for each page of the music, there may be multiple start location indicators. For the example shown in FIG. 6B, when the first time page 4 is performed or displayed, it may start from the beginning of the page (start location indicator not shown). When the second time page 4 is performed or displayed, it may start at the second start location indicator 617. In implementation, the start location indicators may flash a predetermined number of seconds (e.g. 2 seconds) to bring the musician's attention to the relevant starting location on the page. After flashing for a few seconds, the display of the start location indicator may be turned off so that it shows a cleaner page (with less marking) to the musician.

Also note that, for each page of the music, there may be multiple turn page location indicators. For the example shown in FIG. 6B, when the first time page 6 is performed or displayed, it is turned at the turn page indicator 614 back to page 4. When the second time page 6 is performed or displayed, it may be turned at the end of page 6 (turn page indicator not shown) to page 7. In one approach, a numeric number is assigned to each turn page indicator such as number 6 for the turn page indicator 614 on page 6, and number 7 for the turn page indicator 618 on page 4. This numeric number shows the sequence of turn page indicators for the particular piece of music. It may be reset (for example to 1) for each piece of music to be performed. Although the musician typically knows the music very well, the numeric number helps the musician to know where he is during a performance.

Figure 6C:
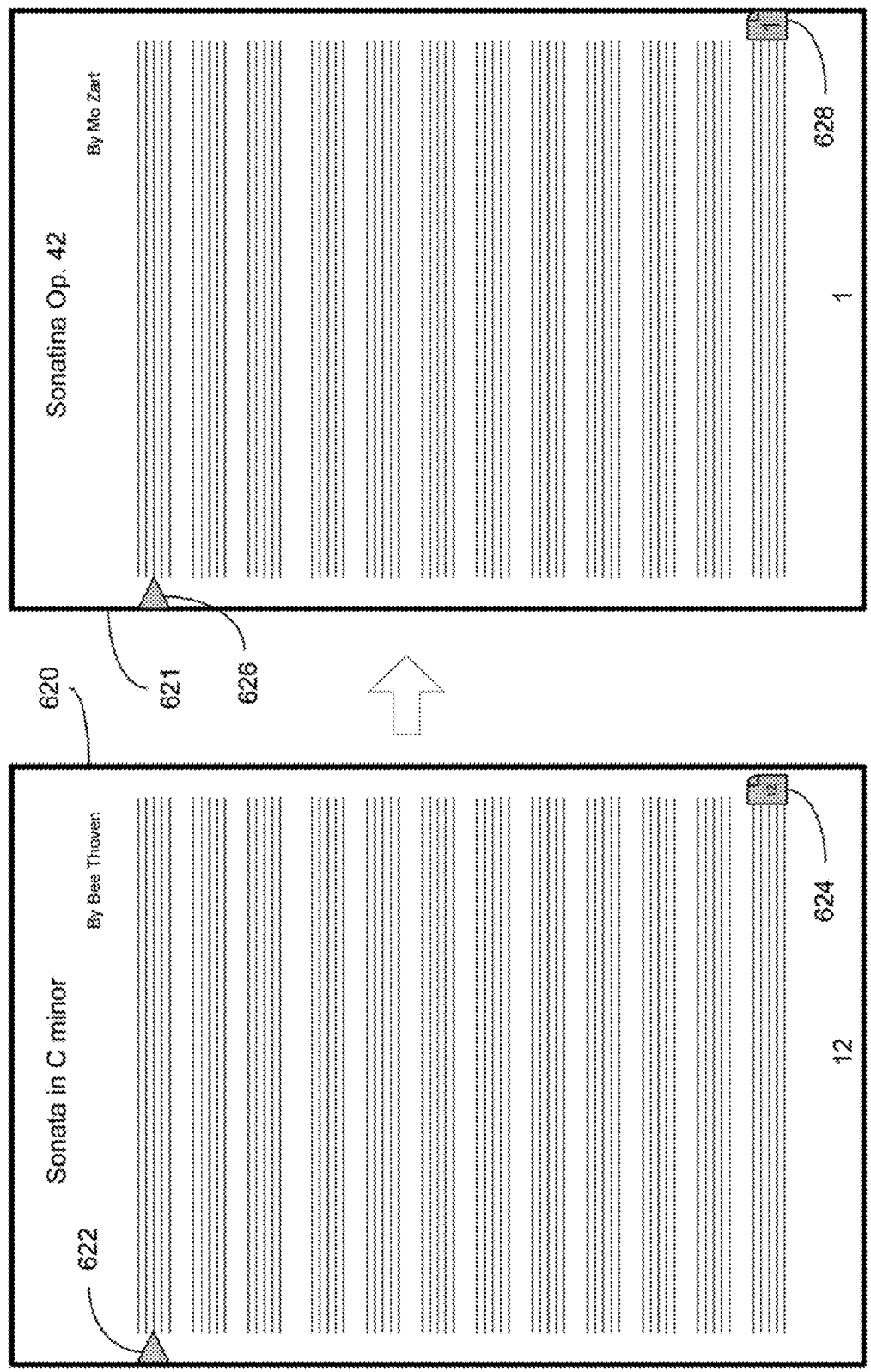
FIG. 6C illustrates a method of transitioning from one music piece to another music piece according to embodiments of the present invention.

FIG. 6C illustrates a method of transitioning from one music piece to another music piece according to embodiments of the present invention. In the example shown in FIG. 6C, the method transitions from a first piece of music Sonata in C minor by Bee Thoven 620 to another piece of music Sonatina Op. 42 by Mo Zart 621. The method is similar to methods described in association with FIG. 6A and FIG. 6B. In this case, a first start indicator 622 is used to guide the user about the starting location and a first turn location indicator 624 is used to remind the user about the turn page location for page 12 of the music Sonata in C minor. In the auto mode, the electronic music display automatically transitions from page 12 of Sonata in C minor to page 1 of Sonatina Op. 42. Alternatively, the musician may choose to issue a turn-page command via a wireless remote controller as described in FIGS. 2A-2B to cause the electronic music display to transition from page 12 of Sonata in C minor to page 1 of Sonatina Op. 42. The electronic music display is able to make this transition because it knows which piece of music is to be played next according to the method of programming described in association with FIG. 4B.

Note that the start location indicators and turn location indicators as shown in FIGS. 6A-6C are programmed by the user. In this way, the user has the control to repeat or skip certain section of the music, in the event he needs to adjust the time of his performance. For example, there may be a need for him to extend his performance by a few minutes in some situations or reduce the time of his performance by a few minutes in some other situations. Having the capability to set the start location indicators and the turn location indicators, and along with the capability to compute total performance time of the programmed music files as described in FIG. 4B allow the user to have one more level of control of his performances.

In another approach, the start location indicators and turn location indicators may be identified and inserted automatically by pre-processing a music file with a music optical character recognition program, which may be configured to mark all the start locations, and turn locations on pages of the music file. With assistance of a music optical character recognition program, it reduces the amount of general programming the user has to perform. In some cases, if the user performs a piece of music in exactly the same way as described by the music file, for example with the same tempo and same repeats, then the programming of this music file may be performed by the controller software of the electronic music display, saving the user time and effort in programming the music file. On the other hand, for many music students, they cannot perform the music at exactly the same way, for example same tempo, as shown on the music sheets, the ability to program the display can be very beneficial to these music students.

Figure 7:
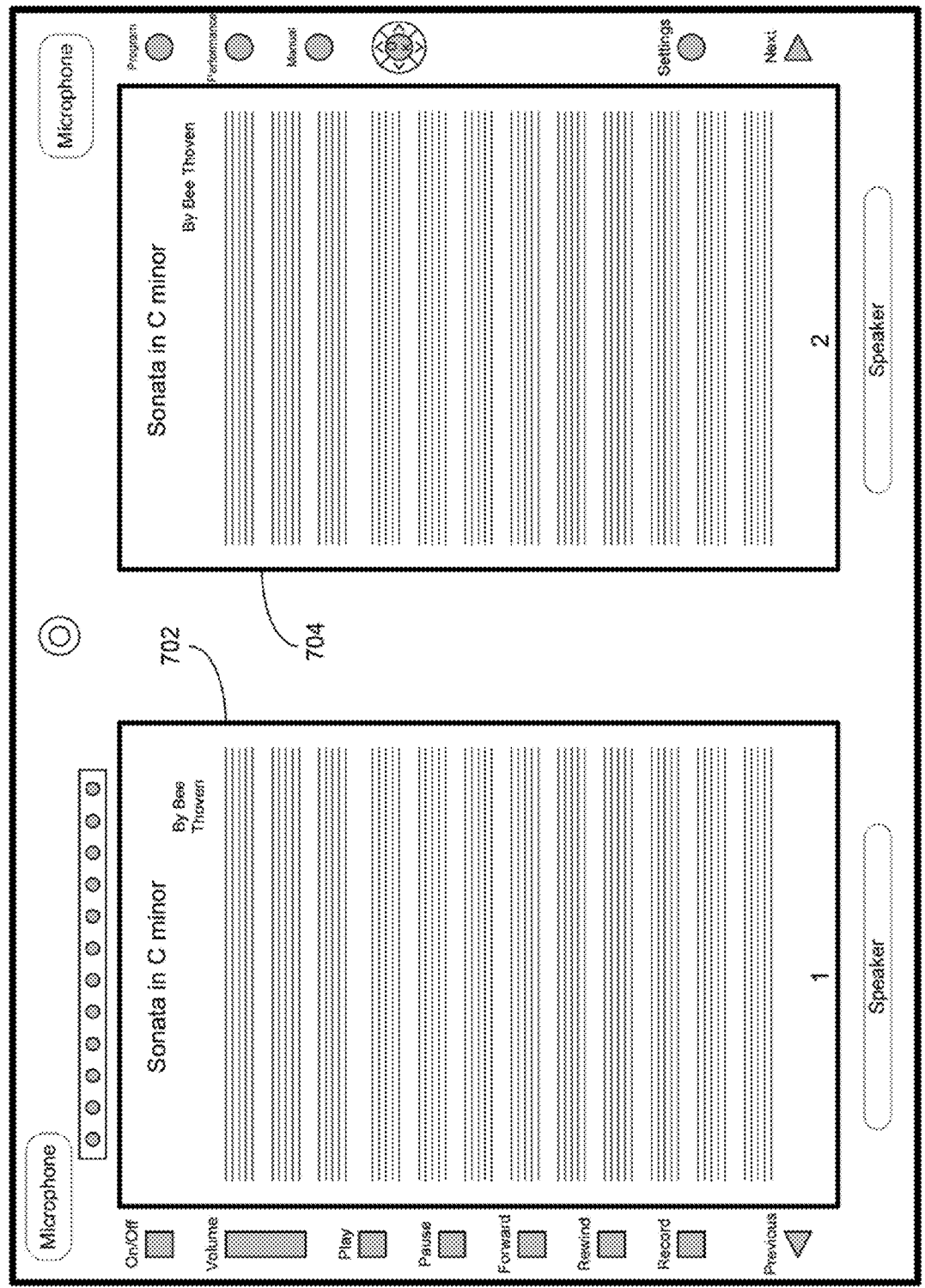
FIG. 7 illustrates another implementation of an electronic music display according to embodiments of the present invention.

FIG. 7 illustrates another implementation of an electronic music display according to embodiments of the present invention. One of the differences of the electronic music display shown in FIG. 7 from that shown in FIG. 1A is that two pages of the music score are displayed in FIG. 7. In one approach, the electronic music display of FIG. 7 may be implemented with two separate displays, one for the page on the left hand side 702, and one for the page on the right hand side 704. With this approach, the electronic music display may be configured to provide a user with a look-ahead capability where the page being performed is displayed on the left screen and the page next to be performed is on the right screen. The left and right pages displayed can be in sequence numerically, such as page 1 on the left screen and page 2 on the right screen as shown in FIG. 7. The left and right pages displayed can also be in the sequence the music is to be played, for example page 6 on the left screen and page 4 on the right screen, as shown in the example of FIG. 6B.

In another approach, displaying the two pages of the music score as shown in FIG. 7 may be implemented with a single screen. In this approach, the user may configure the electronic music display to display two pages of the music score in a landscape mode as opposed to displaying one page of the music score in a portrait mode. In the landscape mode, the size of each page displayed is smaller than the portrait mode, but the user is able to view one more page of music and receive the benefit of the look-ahead capability. In yet another approach, the electronic music display may include two screens capable of displaying two normal paper size music scores, thus providing the user the benefit of viewing multiple pages and at the same time not compromising on the size of the music score being displayed.

Figure 8A:
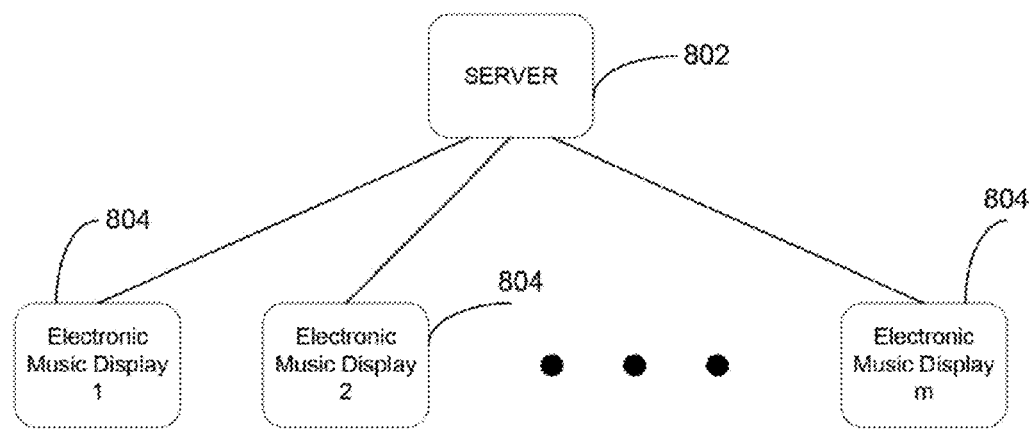
FIG. 8A illustrates a method for musicians to work together using multiple electronic music displays according to embodiments of the present invention.

FIG. 8A illustrates a method for musicians to work together using multiple electronic music displays according to embodiments of the present invention. In one approach, multiple electronic music displays are configured to communicate with each other using IEEE 802.11b, IEEE 802.11g, or Bluetooth technology described in association with FIGS. 2A-2B. In this case, one or more authorized individuals may be able to update and upload a music file to a server 802, where the music file may include certain requirements the authorized individual desires to implement or perform for this piece of music. After the music file and its corresponding requirements are uploaded to the server 802, the server 802 is configured to propagate the music file and its requirements to a group of electronic music displays 804 (electronic music displays 1, 2 . . . n, which are also known as clients) that would be used by musicians to perform the piece of music. In this way, the musicians are informed of any changes in the requirements directly reflected in the music file without a face-to-face meeting. It enables them to practice the new requirements individually prior to their group rehearsal. This is beneficial as it would help to reduce the number rehearsals by the group of musicians prior to a public performance. This method is particularly beneficial if one or more musicians are located in different remote locations, for example, the conductor lives in New York, the pianist lives in San Francisco, and the performance is in Los Angeles with the Los Angeles Philharmonic. This translates to reduced number of trips for the conductor or the pianist to travel to Los Angeles to rehearse for a concert. It also translates to reduced number of rehearsals for the members of Los Angeles Philharmonic.

Figure 8B:
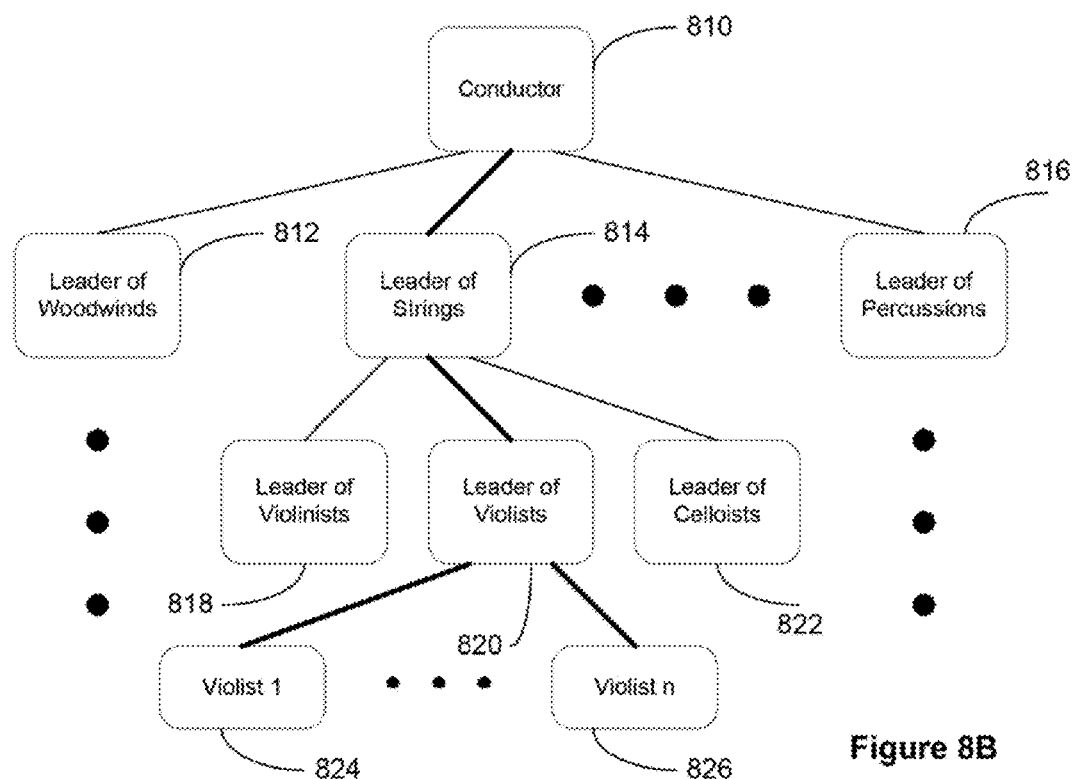
FIG. 8B illustrates another method for musicians to work together using multiple electronic music displays according to embodiments of the present invention.

FIG. 8B illustrates another method for musicians to work together using multiple electronic music displays according to embodiments of the present invention. In this example, a leader-member approach may be employed by a group of musicians. For illustration purposes, each block in FIG. 8B refers to the musician and/or his/her electronic music display. In this case, the conductor's electronic music display 810 is a leader, and the electronic music displays of the orchestra are members. The conductor may first update or upload a music file with its corresponding requirements to his electronic music display 810. Afterwards, the updated music file and corresponding requirements may be propagate via a wireless technology described above to a selected group of members, such as the leader of woodwinds 812, leader of strings 814, and leader of percussions 816, who may used the updated music file and requirements from the conductor to communicate with members of their teams.

There can be multiple levels of leaders and members. For example, the first violinist may be a leader of the strings family 814, but he may also be a member with respect to the conductor 810. This hierarchy may further be partitioned into leader for the violinists 818, leader for the cellists 820, and leader for the violists 822, respectively. Each leader of the violinists, cellists, and violists is a member with respect to the leader of the strings family 814. One person may play multiple roles, such as the first violinist may be a leader of the strings family and he may also be a leader of the violinists. In this way, specific requirements for musicians of different music instruments may be communicated more efficiently. In addition, the updates and changes in requirements may be divided and allocated to different musicians more effectively. In the example shown in FIG. 8B, specific updates and requirements for the strings family may be communicated from the conductor's electronic music display 810 to electronic music display of the leader of the strings family 814; specific updates and requirements for the violists may be communicated from the electronic music display of the leader of the strings family 814 to the electronic music display of the leader of the violists 820; and specific updates and requirements for certain violists may be communicated from the electronic music display of the leader of the violists 820 to selected violist 1 (824) and violist n (826), for instance. The hierarchy of this exemplary communication is highlighted in bold in FIG. 8B. As a result, each musician is enabled to practice the updates and requirements individually using the information communicated to them via the electronic music display, which reduces the amount of time and the number of rehearsals the group of musicians would use in preparing for a concert or performance.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various' embodiments with various modifications as suited to the particular use contemplated.

What is claimed is:

1. A method for displaying music files, comprising:
providing an electronic music display, wherein the electronic music display includes a user interface configured to receive one or more music files, a memory device configured to store the one or more music files, and a display configured to display one or more pages of the one or more music files;
programming the electronic music display in accordance with user specified requirements with respect to order of the one or more music files to be displayed and with respect to tempos that corresponding different sections of the one or more music files to be performed, wherein programming the electronic music display in accordance with user specified requirements further comprises: for each music file, identifying a plurality of sections, each section includes: a start location indicator configured to show a location on a displayed page where the performance is to start; a turn location indicator configured to show a location on a displayed page where a turn to a next page is to occur, wherein the start location indicator and the turn location indicator are provided at any line of the displayed page, wherein said any line includes locations other than the beginning and ending lines of the displayed page; and
displaying a sequence of pages of the one or more music files as programmed automatically.

2. The method of claim 1, wherein programming the electronic music display in accordance with user specified requirements comprises:
selecting one or more music files to be displayed;
inserting a user specified rest period between two music files;
arranging the one or more music files to be displayed and their corresponding rest periods to form a sequence of programmed music files to be performed, and
storing the sequence of programmed music files to be performed in the memory device.

3. The method of claim 1, programming the electronic music display in accordance with user specified requirements further comprises:
for each music file, identifying a plurality of sections, each section includes:
the start location indicator is located other than at a beginning of the displayed page;
the turn location indicator is located other than at an end of the displayed page; and
a tempo for the section of the music file to be performed.

4. The method of claim 1, displaying a sequence of pages of the one or more music files as programmed comprises:
synchronizing performance using a start location indicator on a page of a music file;
determining an amount of time to turn the page using a preprogrammed tempo for the section of the music file;
monitoring an amount of time elapsed from the start location indicator during performance; and
displaying a next page automatically when the amount of time elapsed reaches the amount of time to turn the page.

5. The method of claim 4, wherein synchronizing performance comprising:
synchronizing beginning of a performance by flashing the start location indicator on first page of the sequence of pages of the one or more music files as programmed for a predetermined number of times.

6. The method of claim 4, wherein synchronizing performance further comprising:
synchronizing beginning of a performance by flashing the start location indicator on first page of the sequence of pages of the one or more music files as programmed with a sequence of color light emitting diodes.

7. A method for displaying music files, comprising:
providing an electronic music display, wherein the electronic music display includes a user interface configured to receive one or more music files, a memory device configured to store the one or more music files, and a display configured to display one or more pages of the one or more music files;
programming the electronic music display in accordance with user specified requirements with respect to order of the one or more music files to be displayed and with respect to a plurality of turn page locations corresponding to different sections of the one or more music files to be performed, wherein programming the electronic music display in accordance with user specified requirements further comprises: for each music file, identifying a plurality of sections, each section includes: a start location indicator configured to show a location on a displayed page where the performance is to start; a turn location indicator configured to show a location on a displayed page where a turn to a next page is to occur, wherein the start location indicator and the turn location indicator are provided at any line of the displayed page, wherein said any line includes locations other than the beginning and ending lines of the displayed page; and displaying a sequence of pages of the one or more music files as programmed in accordance with one or more turn page commands received by the electronic music display.

8. The method of claim 7, wherein programming the electronic music display in accordance with user specified requirements comprises:

selecting one or more music files to be displayed;

inserting a user specified rest period between two music files;

arranging the one or more music files to be displayed and their corresponding rest periods to form a sequence of programmed music files to be performed; and storing the sequence of programmed music files to be performed in the memory device.

9. The method of claim 7, wherein:

the start location indicator is located other than at a beginning of the displayed page; and the turn location indicator is located other than at an end of the displayed page.

10. The method of claim 7, displaying a sequence of pages of the one or more music files as programmed comprises:

receiving a turn page command from a remote controller;

determining whether the turn page command is valid;

if the turn page command is valid, displaying a next page; and if the turn page command is not valid, displaying current page being displayed.

11. The method of claim 10, wherein determining whether the turn page command is valid comprises:

monitoring an amount of time elapsed since last turn page command is received;

comparing the amount of time elapsed to a threshold preset delay programmed for a section of music of the current page;

if the amount of time elapsed is larger or equal to the threshold present delay, displaying the next page; and if the amount of time elapsed is smaller than the threshold present delay, displaying the current page being displayed.

12. An electronic music display comprises:

a user interface configured to receive one or more music files;

a memory device configured to store the one or more music files;

a controller configured to program the electronic music display in accordance with user specified requirements with respect to order of the one or more music files to be displayed and with respect to tempos that corresponding different sections of the one or more music files to be performed, wherein a start location indicator configured to show a location on a displayed page where the performance is to start; and a turn location indicator configured to show a location on a displayed page where a turn to a next page is to occur, wherein the start location indicator and the turn location indicator are provided at any line of the displayed page, wherein said any line includes locations other than the beginning and ending lines of the displayed page; and a display configured to display a sequence of pages of the one or more music files as programmed.

13. The electronic music display of claim 12 further comprises:

a program button configured to allow a user to program the electronic music display to display one or more music files for performance or for practice.

14. The electronic music display of claim 12 further comprises:

a performance button configured to display a set of user programmed music files consecutively during a performance.

15. The electronic music display of claim 12 further comprises:

a manual button configured to display a music file in manual mode, wherein a next page is displayed in response to a next button being pressed, and a previous page is displayed in response to a previous button being pressed.

16. The electronic music display of claim 12 further comprises:

a metronome configured to display a pre-programmed tempo for a section of a music file.

17. The electronic music display of claim 12 further comprises:

a wireless network interface configured to support wireless communications between the electronic music display and a remote controller.

18. The electronic music display of claim 12 further comprises:

the start location indicator is located other than at a beginning of the displayed page; and the turn location indicator is located other than at an end of the displayed page.

19. The electronic music display of claim 12, wherein the controller comprises a processor and its associated software and hardware control logic.

20. The electronic music display of claim 12, wherein the user interface comprises a touch screen configured to implement user control buttons with the touch screen display.

* * * * *